Sept. 4, 1923.                                              1,467,230
C. O. COZZENS
EYE PROTECTOR
Filed April 2, 1920
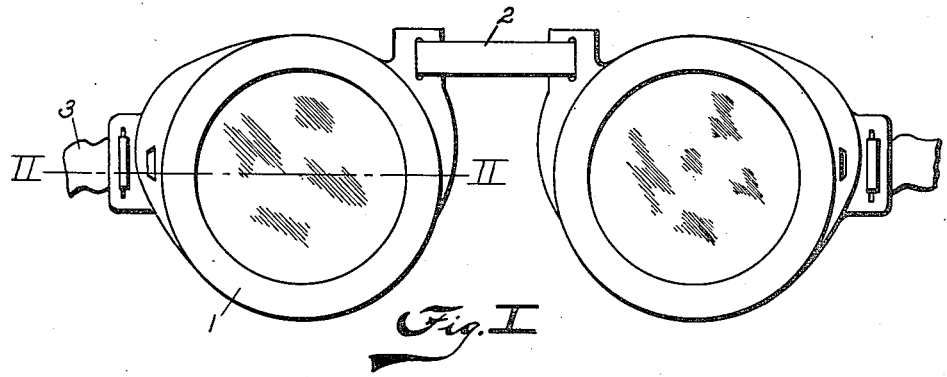
Fig. I
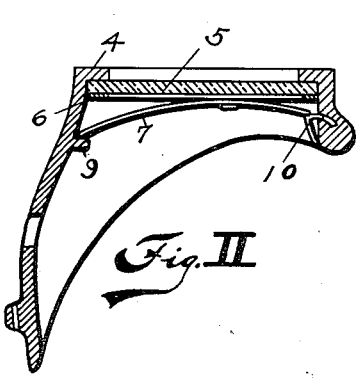
Fig. II
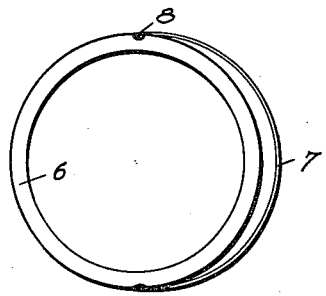
Fig. III
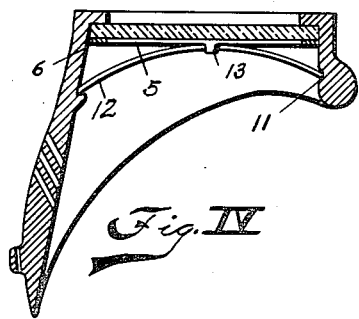
Fig. IV
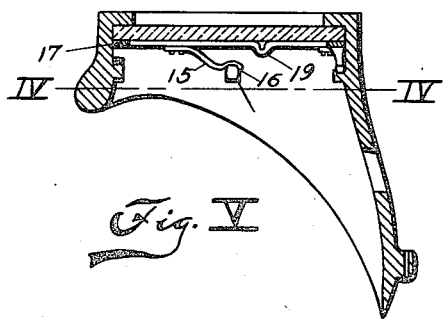
Fig. V
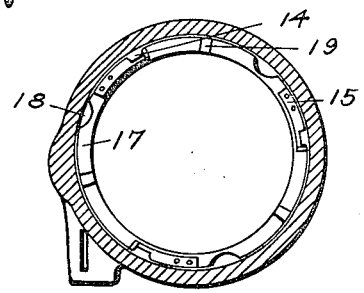
Fig. VI
INVENTOR
CHARLES O. COZZENS
BY
H. H. Styll & H. K. Parsons
ATTORNEYS Patented Sept. 4, 1923.

1,467,230

UNITED STATES PATENT OFFICE.

CHARLES O. COZZENS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE PROTECTOR.

Application filed April 2, 1920. Serial No. 370,711.

*To all whom it may concern:*

Be it known that I, CHARLES O. COZZENS, a citizen of the United States, residing at Southbridge, in the county of Worcester and State of Massachusetts, have invented certain new and useful Improvements in Eye Protectors, of which the following is a specification.

This invention relates to improvements in eye protectors and has particular reference to novel and improved means for retaining the lenses in position within the protectors.

One of the leading objects of the present invention is the provision of new and improved means for resiliently and removably securing lenses in position in the cups of eye protectors.

A further object of the invention is the provision of a simple and efficient device usable in connection with a molded goggle eye cup or the like for satisfactorily retaining the lenses in position within the cup but permitting of their ready replacement as desired.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a structure embodying my improvements.

Figure II represents a sectional view as on the line II—II of Figure I.

Figure III represents a plan view of one form of locking ring for use in connection with my invention.

Figure IV represents a detail view of another form of locking device.

Figure V represents a sectional view illustrating the use of another form of my invention.

Figure VI represents a sectional view taken as on the line VI—VI of Figure V.

In the drawings, in which similar characters of reference denote corresponding parts throughout the several views, the numeral 1 designates as an entirety the eye cups, having the bridge or connecting portion 2 and the head bands 3 for retaining the same in position on the face.

In that form of the invention illustrated in connection with Figure II, I have shown the cups formed at the front edge with the inwardly deflected flange portion 4, behind which fits the lens 5, while retaining the lens in position is the backing ring 6 loosely bearing against the lens and yieldingly or resiliently pressed thereagainst as by the springs 7 secured as at 8 to the ring 6 and suitably supported at the interior of the cup. For supporting the rings in position I may if desired form on the interior of the eye cup the abutment lug 9 against which one end of the resiliently locking member 7 rests, while the diametrically opposite portion thereof may be held as by the depressible latch member 10. It will thus be seen that the lens is dropped in position within the cup resting against the flange 4 and the resilient locking member placed within the cup, one side of the spring ring 7 being hooked under the lug 9 and the other then pressed down past the keeper 10 when it will form a spring arch centrally bearing against the ring 6 and holding the ring 6 yieldingly against the lens so that the lens may yield backwards somewhat under a blow or tilt slightly at one edge or the other, if the blow is delivered other than centrally thereagainst or the device may be removed for replacement of a lens by disengagement of the ring 7 or the keeper 10.

In Figure IV. I have shown a slight modification of the invention in which the eye cup is provided with the recesses 11 at the sides to receive the spring ring 12 which is loosely secured to the lens engaging ring 6 by the eyes or similar connection 13 so that the parts may slide as desired with respect to each other, but are held against separation so that they may be handled as a unit, the member 12 simply being snapped into the grooves or recesses 11 to lock the parts together.

In Figures V and VI. I have shown a further modification of my invention in which the cup is formed with a plurality of inwardly projecting lugs 14 forming rests for the spring fingers 15, having the angular arcuated extensions 16 shaped to fit around the lugs when in locked position. In this instance the lens engaging ring 17 may if desired be provided with the notches 18 to slide over the lugs 14, while the spring fingers 15 are secured to the ring, which after being slid by the lugs may be rotated, causing the fingers to slide up over the lugs until the extensions 16 snap down thereonto and lock the parts against rotation. Operating portions 19 may be formed on the ring 17 as by crimping of the material thereof or by separately securing the same thereto, as desired.

From the foregoing description it will be seen that I have provided a simple and improved construction of eye protector in which the lenses are resiliently and removably retained in position in a simple and efficient manner and are capable of ready replacement as desired; also that I have provided an improved form of backing ring for the resiliently mounted lens which is of sufficient size to somewhat brace and support the lens and also of size to eliminate any possibility of the lens slipping out of engagement therewith, even though the lens may be cut or edged slightly under-size, thus eliminating the difficulties which have sometimes been experienced with retaining wires for lenses which have required undue exactitude of fitting of the parts in order to be commercially practicable.

I claim:

1. A device of the character described, including an eye cup having a lens seat, means for yieldingly holding a lens against the seat, a snap connection between the yielding holding means and the eye cup, and means for relatively shifting the resilient lens support and holding means for disengagement of the parts.

2. In a device of the character described, the combination with an eye cup having a lens receiving seat and a plurality of inward projections adjacent the seat, of a lens locking ring having a plurality of spring fingers for engagement with the projections and having projecting portions to facilitate rotation of the ring to snap the spring fingers into and out of engagement with the projections.

3. A device of the character described, comprising an eye cup member having an inturned flange providing a lens retaining seat, and having a plurality of inwardly projecting lugs, and a lens retaining member in the form of a ring having a plurality of rearwardly curving spring fingers terminating in angular arcuated extensions adapted to be rotatably shifted to cause the extensions to spring into engagement with the lugs and force the retaining member in the direction of the flange.

In testimony whereof I have affixed my signature, in presence of two witnesses.

CHARLES O. COZZENS.

Witnesses:
ESTHER M. LAFLER,
ALICE G. HASKELL.